Patented June 22, 1937

2,084,917

UNITED STATES PATENT OFFICE 2,084,917

METHOD OF PREPARING TITANIUM DIOXIDE PIGMENTS

Walter K. Nelson, Brooklyn, N. Y., assignor, by mesne assignments, to National Lead Company, New York, N. Y., a corporation of New Jersey No Drawing. Application May 19, 1934
Serial No. 726,578

22 Claims. (Cl. 134—58)

My invention relates to the preparation of titanium dioxide of a uniform and finely-divided state of sub-division and also having a desired pH value, such titanium dioxide being substantially free from such aggregates as will adversely affect the smooth texture of a paint film. My invention more particularly relates to the removal of such particles from a water suspension of calcined titanium dioxide, and also to a novel and improved treatment for adjusting the pH value of the resultant more finely-divided titanium dioxide to a predetermined desired value.

Titanium dioxide pigments prepared according to well-known processes of the prior art, such as by hydrolysis and calcination, exhibit during hydrolysis a tendency to form aggregates which upon calcination become hard, coarse particles.

The presence of these coarse particles in a paint film breaks up the smooth, glossy texture of the surface of the film. Attempts to separate these large-sized agglomerates from calcined titanium dioxide, for example by sieving or wet milling with water, have proved impractical, and it has been found to be virtually impossible to eliminate or reduce the particle size of these coarse aggregates in heat-treated titanium dioxide by the commonly used grinding processes.

The object of my invention is, among other things, to effect the removal of these coarse, hard agglomerates from calcined titanium dioxide in an efficient and practical manner as well as to provide novel methods for adjusting the pH value of the titanium dioxide from which the removal of the coarse particles has been effected to a predetermined desired value.

These and other objects of my invention are attained by novel methods which are hereinafter set forth.

I have discovered that precipitated and calcined titanium dioxide, prepared in any usual manner, may be dispersed into a fine state of subdivision by intimately mixing, as by grinding, ball-milling or vigorous and/or prolonged stirring as may be obtained in a mechanical stirring device, preferably in the moist or wet state, the titanium dioxide with certain acidic substances under conditions of hydrogen ion concentration of about pH 0.5 to pH 5.0, depending on the amount and character of the acidic substance selected.

These acidic substances, hereinafter referred to as producing the desired dispersing effect, comprise the halides of tervalent or tetravalent elements, which under the conditions of my process, yield clear or only slightly turbid solutions in water. Such compounds include the halogen salts, for example the chlorides and bromides of aluminum, iron, cerium, titanium, zirconium, thallium and thorium, in which these elements are in the condition of highest valence. One such compound which I have found to be particularly suitable is aluminum chloride ($AlCl_3$). My improved methods may be effectively carried out by employing such a dispersing agent alone or by using a mixture of two or more of such agents, in any quantity short of that sufficient to produce substantially the reverse or flocculating effect.

I am aware that British Patent No. 385,315 to Blumenfeld discloses a process for improving titanium dioxide by dispersion in an aqueous suspension by the use only of alkaline dispersing agents, such as the hydroxides and carbonates of sodium, potassium and ammonium, under conditions of pH 9 to pH 12.

I am also aware that the U. S. Patent No. 1,937,037 to Hanahan dated November 28, 1933 also discloses a process for improving titanium dioxide by dispersion in an aqueous suspension by employing alkaline dispersing agents under conditions of pH 7.2 to pH 10, and then separating the suspension of finer particles by elutriation.

My methods are distinguished from the disclosures of these and other prior patents by the use of dispersing agents of acidic nature heretofore not recognized as possessing such properties. Furthermore, the products of these and other prior patents are of an indefinite and unadjusted pH value, whereas my improved titanium dioxide pigments may be produced of any desired pH value to be determined by the use to which they are to be put, according to my improved method which is one feature of the present invention.

In addition, I have now discovered that the dispersion of calcined precipitated titanium dioxide by means of the indicated acidic substances differs from that obtained with the basic agents of the prior patents in that, under suitable conditions, the dioxide dispersed, for example with aluminum chloride, settles out from the suspension in a relatively short time so as to leave a clear supernatant liquor containing the bulk of the dispersing agent which may then be recovered and returned for use with a fresh charge of calcined pigment. On the other hand, when the dioxide is dispersed with alkaline substances, it remains in suspension for a long period of time so that no recovery of the dispersing agent is possible.

In carrying out my invention, I generally grind the calcined precipitated titanium dioxide with about 1.3 times its weight of water containing 1 to 5% of a halide, based on the weight of pigment, of a tervalent or tetravalent element, as for example, aluminum chloride, which, under the conditions of my improved methods, yields clear or only slightly turbid solutions. The suspension so obtained is diluted to a concentration of about 100 grams of $TiO_2$ per liter. There results from this treatment an extremely fine dispersion in which the finer particles remain suspended while the large particles settle out rapidly.

It should be noted that by the term "precipitated and calcined titanium dioxide" I mean to include not only 99.9% pure titanium dioxide but also titanium dioxide which has been calcined in the presence of other substances such as an alkali metal salt or other salts, or composite titanium dioxide pigments, such as mixtures of $TiO_2$ with sulfate extenders or zinc oxide etc.

I may, however, vary the general procedure hereinbefore described by allowing the suspension obtained by grinding the calcined titanium dioxide pigment with the indicated dispersing agent to stand, whereby the titanium dioxide settles out leaving a clear supernatant liquid containing the bulk of the dispersing agent, which may be separated from the sedimented slurry by any suitable means, for example by decantation, and returned for further grinding with a fresh charge of calcined pigment. The sedimented slurry is then diluted to about 100 grams of $TiO_2$ per liter so as to obtain a dispersion similar to that hereinbefore described.

The suspension of fine particles from which the coarse aggregates have separated as a sediment and obtained as heretofore described, is now separated from the sedimentary particles in any suitable manner as by decantation, elutriation, etc.

It should be observed that by the use of my novel dispersing agents, no such elaborate process as elutriation is required for separation of the fine particles, because at the pH values at which my methods are preferably operated, the coarse particles settle so completely as to leave the finer particles in suspension; hence by a simple manipulation such as decantation a substantially complete separation is obtained.

The coarse particles separated from the suspension of finer titanium dioxide particles may be returned to a fresh charge of calcined titanium dioxide for similar grinding and dispersing treatments.

In order to obtain the finer particles of titanium dioxide pigment from the suspension, freed from the coarse aggregates, I may add a suitable coagulating agent in the well-known manner. Suitable for such coagulating or flocculating effect may be mentioned substances such as sulfuric acid, magnesium sulfate, and other acids or salts. Or, I may also avail myself of such coagulating agents as sulfates of alkaline earth metals, such as barium sulfate, with which it is desired to associate intimately the titanium dioxide.

The suspension of finer particles of titanium dioxide, so treated with a suitable coagulating agent, deposits as a sediment those finer particles. The precipitate is filtered, dewatered and disintegrated, and if desired, may be subjected to additional dry milling.

Therefore according to my improved methods, titanium dioxide pigments are obtained of extremely fine and uniform particle size comprising, as determined by particle size analysis, particles of below 15 microns in size.

These titanium pigments are particularly well adapted for use in paints, in which compositions they permit of smooth surfaces possessing higher gloss than was heretofore possible with the titanium dioxides prepared by processes of the prior art. Furthermore, by my improved methods the tinting strength, hiding power, and oil absorption are in no way adversely affected. As a matter of fact, my titanium dioxide pigments possess exceptionally fine mixing qualities when incorporated with drying oil.

These novel titanium pigments are characterized by possessing, beside the properties just noted, a pH value, owing to the acidic nature of the dispersing agents used, of from pH 4.0 to pH 6.0, usually about pH 5.0, and only contain as impurities spectroscopically detectable amounts of the element or elements which, as tervalent or tetravalent halides, were added as the dispersing agent or agents in the manner described. The pH value of the resulting pigment is determined in the well-known manner, for example, either by electrometric or colorimetric methods.

However, for certain uses, such as a filler in rubber compositions, titanium dioxides of an acid pH value are not advantageous due to the fact that they exert a retarding influence on the rate of cure of such compositions. Accordingly, as one feature of my invention, I have provided a novel method for adjusting the pH value to any desired value such as in this case to neutrality or slightly on the alkaline side which I will now describe.

The washed pigment obtained according to my hereinbefore described methods and having a pH value of about 5.0 is treated with a small quantity of a basic reagent, such as alkali and alkaline earth hydroxides, carbonates and related compounds sufficient to yield a pigment of the desired pH value. Such basic reagents may be either soluble or substantially insoluble in water, such as sodium carbonate and magnesium carbonate.

If a water-soluble basic agent is used, it is necessary to employ a solution of sufficiently high concentration so that, after intimately mixing, as by grinding, with my washed acid titanium dioxides and allowing same to settle, there will remain in the precipitated slurry a sufficient amount of occluded reagent to effect the desired adjustment in pH value. It is somewhat simpler to use an alkaline reagent substantially insoluble in water, such as magnesium carbonate. In the latter case, it is only necessary to intimately mix with my improved titanium dioxide, as by grinding, the dry reagent with a water slurry of the dioxide, or by stirring together a slurry of the reagent and a slurry of the dioxide, with a sufficient quantity of reagent which after filtering and dewatering will yield a pigment having the desired pH value. These titanium pigments I also regard as novel.

Now, having generally described my invention and the general procedures to be followed, I will now give some specific illustrative examples for its use. It is understood of course that my invention is merely illustrated but not restricted by the following examples.

*Example I.*—A mixture of 150 kg. of calcined precipitated titanium dioxide and 200 liters of water containing 2 to 3 kg. of cerium tetrachloride is ground for four hours in a ball grinder, and the suspension is then diluted to 1500 liters. The resulting liquor is allowed to settle in a vat for 3 to 4 hours, and about 85–90% of the suspension is withdrawn free from larger particles. To this suspension is added a solution of 800 to 1000 grams of magnesium sulphate in 2000 c.c. of water to coagulate the particles, and then the coagulated precipitate is separated from the liquid, washed, dried, and disintegrated in the customary manner. The residue from the decantation is ground again with the following charge of calcined titanium dioxide pigment.

*Example II.*—A similar mixture of calcined titanium dioxide, cerium tetrachloride and water is ball milled, and the fine fraction separated and coagulated as described in Example I. After thorough washing either by decantation or in a filter press, the product is repulped and treated with 0.1% of magnesium carbonate ($MgCO_3$) (based on the $TiO_2$ content), after which the resulting slurry is dewatered, dried and disintegrated in the usual manner.

*Example III.*—A mixture of 150 kg. of calcined precipitated titanium dioxide, and 200 liters of water containing 4 to 5 kg. of aluminum chloride is ground in a ball mill, and the resulting suspension allowed to stand in a vat for 8 to 10 hours, after which the clear supernatant liquor containing about 80% of the aluminum chloride is separated from the settled pigment and is returned for grinding with the following charge of calcined titanium dioxide pigment. The sedimented slurry is then diluted to about 1500 liters, and such suspension is subjected to decantation or elutriation whereby the finer particles are separated from the coarser particles which are returned for further grinding, while the fine particles are coagulated and otherwise treated as described in Examples I and II.

*Example IV.*—A charge of 150 kg. of calcined precipitated titanium dioxide and 200 liters of water containing 2.5 to 3.5 kg. of ferric chloride is ground for 3 to 4 hours and the resulting suspension treated as described in Examples I, II or III to effect a separation of the finer from the coarser particles. The separated fine particles are coagulated and treated in the usual manner, while the coarser particles are returned for further grinding.

*Example V.*—A charge of 150 kg. of calcined precipitated titanium dioxide and 200 liters of water containing 3.5 kg. of titanium tetrachloride is ground for 3 to 4 hours, and the resulting suspension treated as described in Examples I, II or III to effect a separation of the finer from the coarser particles.

*Example VI.*—A charge of 150 kg. of calcined precipitated titanium dioxide and 200 liters of water containing 4 to 5 kg. of zirconium tetrachloride is ground for 3 to 4 hours, and the resulting suspension treated as described in Examples I, II, III or IV.

*Example VII.*—A charge of 150 kg. of calcined precipitated titanium dioxide and 200 liters of water containing 5 kg. of thallium trichloride is ground for 3 to 4 hours, and the resulting suspension treated as described in preceding examples.

*Example VIII.*—A charge of 150 kg. of calcined precipitated titanium dioxide and 200 liters of water containing 5 to 6 kg. of thorium tetrachloride is ground for 3 to 4 hours, and the resulting suspension treated as described in preceding examples.

From the foregoing description it will be particularly noted that I have attained very practical advantages in the simplified procedures set forth whereby titanium dioxide pigments are readily produced of the desired particle size and texture that render them especially suitable in paint formulae, and also for adjusting the pH value of the final uniformly sized pigments to different requirements in the arts.

I claim as my invention:—

1. In a method for separating a calcined titanium dioxide pigment into particles of different sizes, the step which consists in intimately mixing said pigment in water with a relatively small amount of an acid-reacting salt selected from the group consisting of the halides of aluminum, iron, cerium, zirconium, thallium and thorium in which these elements are in the condition of highest valence.

2. In a method for separating a calcined titanium dioxide pigment into particles of different sizes, the step which consists in intimately mixing said pigment in water with a relatively small amount of aluminum chloride.

3. In a method for separating a calcined titanium dioxide pigment into particles of different sizes, the step which consists in intimately mixing said pigment in water with a relatively small amount of cerium tetrachloride.

4. In a method for separating a calcined titanium dioxide pigment into particles of different sizes, the step which consists in intimately mixing said pigment in water with a relatively small amount of a titanic halide.

5. A method for separating a calcined titanium dioxide pigment into particles of different sizes, which comprises intimately mixing said pigment in water with a relatively small amount of an acid-reacting salt selected from the group consisting of the halides of aluminum, iron, cerium, zirconium, thallium and thorium in which these elements are in the condition of highest valence, allowing the coarser particles to settle out, coagulating the dispersion of finer particles, and recovering and washing the coagulated precipitate.

6. The method of claim 5 in which the recovered washed particles in the form of an aqueous slurry are then treated with a water-insoluble basic reagent to obtain after dewatering a pigment of pH=7 or higher.

7. The method of claim 5 in which the recovered washed particles in the form of an aqueous slurry are then treated with a water-insoluble basic reagent to obtain after dewatering a neutral pigment.

8. The method of claim 5 in which the recovered washed particles in the form of an aqueous slurry are then treated with a water-insoluble basic reagent to obtain after dewatering a basic pigment.

9. The method of claim 5 in which the recovered washed particles in the form of an aqueous slurry are then treated with magnesium carbonate to obtain after dewatering a pigment of pH=7 or higher.

10. The method of claim 5 in which the recovered washed particles in the form of an aqueous slurry are then treated with a water-soluble basic reagent to obtain after dewatering a pigment of pH=7 or higher.

11. The method of claim 5 in which the recovered washed particles in the form of an aqueous slurry are then treated with sodium carbonate to obtain after dewatering a pigment of pH=7 or higher.

12. A method for separating a calcined titanium dioxide pigment into particles of different sizes, which comprises intimately mixing said pigment in water with a relatively small amount of a mixture of acid-reacting salts selected from the group consisting of the halides of aluminum, iron, cerium, zirconium, thallium and thorium in which these elements are in the condition of highest valence, allowing the coarser particles to settle out, coagulating the dispersion of finer particles, and recovering and washing the coagulated precipitate.

13. A method for separating a calcined titanium dioxide pigment into particles of different sizes, which comprises intimately mixing said pigment in water with a relatively small amount of aluminum chloride, allowing the coarser particles to settle out, coagulating the dispersion of finer particles, and recovering and washing the coagulated precipitate.

14. A method for separating a calcined titanium dioxide pigment into particles of different sizes, which comprises grinding said pigment in water containing a relatively small amount of an acid-reacting salt selected from the group consisting of the halides of aluminum, iron, cerium, zirconium, thallium and thorium in which these elements are in the condition of highest valence to cause dispersion therein, allowing the mixture to stand and decanting the supernatant solution containing the dispersing agent, adding water to the settled pigment, and recovering the finer particles by decantation and flocculation.

15. A method for separating a calcined titanium dioxide pigment into particles of different sizes, which comprises grinding said pigment in water containing a sufficient amount of an acid-reacting salt selected from the group consisting of the halides of aluminum, iron, cerium, zirconium, thallium and thorium in which these elements are in the condition of highest valence to give an acidity of about pH 0.5 to 5.0 and cause dispersion of the pigment particles therein, allowing the mixture to stand and decanting the supernatant solution containing the dispersing agent, adding water to the settled pigment, and recovering the finer particles by decantation and flocculation.

16. A method for separating a calcined titanium dioxide pigment into particles of different sizes, which comprises grinding said pigment in water containing a relatively small amount of an acid-reacting salt selected from the group consisting of the halides of aluminum, iron, cerium, zirconium, thallium and thorium in which these elements are in the condition of highest valence to cause dispersion but in amount insufficient to produce flocculation therein, allowing the mixture to stand and decanting the supernatant solution containing the dispersing agent, adding water to the settled pigment, and recovering the finer particles by decantation and flocculation.

17. The method for removing particles of a size larger than 15 microns from a calcined titanium dioxide pigment, which comprises grinding said pigment in water containing a sufficient amount of aluminum chloride to give an acidity of about pH 0.5 to 5.0 and cause dispersion of the pigment particles therein, allowing the mixture to stand, decanting the supernatant solution containing the greater part of said aluminum chloride, adding water to the settled pigment, and recovering the particles finer than 15 microns by settling, decantation and flocculation.

18. In the method for making titanium dioxide pigments free from coarse particles and of pH=7 or higher, the steps which comprise intimately mixing calcined titanium dioxide in water with a relatively small amount of an acid-reacting salt selected from the group consisting of the halides of aluminum, iron, cerium, zirconium, thallium and thorium in which these elements are in the condition of highest valence, and treating the finer particles recovered from said dispersion with a water-insoluble basic reagent.

19. In the method for making titanium dioxide pigments free from coarse particles and of pH=7 or higher, the steps which comprise intimately mixing calcined titanium dioxide in water with a relatively small amount of an acid-reacting salt selected from the group consisting of the halides of aluminum, iron, cerium, zirconium, thallium and thorium in which these elements are in the condition of highest valence, and treating the finer particles recovered from said dispersion with magnesium carbonate.

20. In the method for making titanium dioxide pigments free from coarse particles and of pH=7 or higher, the steps which comprise intimately mixing calcined titanium dioxide in water with a relatively small amount of an acid-reacting salt selected from the group consisting of the halides of aluminum, iron, cerium, zirconium, thallium and thorium in which these elements are in the condition of highest valence, and treating the finer particles recovered from said dispersion with a water-soluble basic reagent.

21. In the method for making titanium dioxide pigments free from coarse particles and of pH=7 or higher, the steps which comprise intimately mixing calcined titanium dioxide in water with a relatively small amount of an acid-reacting salt selected from the group consisting of the halides of aluminum, iron, cerium, zirconium, thallium and thorium in which these elements are in the condition of highest valence, and treating the finer particles recovered from said dispersion with sodium carbonate.

22. A method for separating a calcined titanium dioxide pigment into particles of different sizes, which comprises intimately mixing said pigment in water with a sufficient amount of an acid-reacting salt selected from the group consisting of the halides of aluminum, iron, cerium, zirconium, thallium and thorium, in which these elements are in the condition of highest valence, to give an acidity of about pH 0.5 to 5.0, but in amount insufficient to produce flocculation therein, allowing the coarser particles larger than 15 microns to settle out, coagulating the dispersion of finer particles, and recovering and washing the coagulated precipitate.

WALTER K. NELSON.